May 24, 1960 A. G. FISCHER 2,938,136

ELECTROLUMINESCENT LAMP

Filed Aug. 26, 1958

Inventor:
Albrecht G. Fischer,
by Ernest W. Legree
His Attorney.

United States Patent Office 2,938,136
Patented May 24, 1960

2,938,136

ELECTROLUMINESCENT LAMP

Albrecht G. Fischer, Cleveland Heights, Ohio, assignor to General Electric Company, a corporation of New York Filed Aug. 26, 1958, Ser. No. 757,360
6 Claims. (Cl. 313—108)

Figure 1:
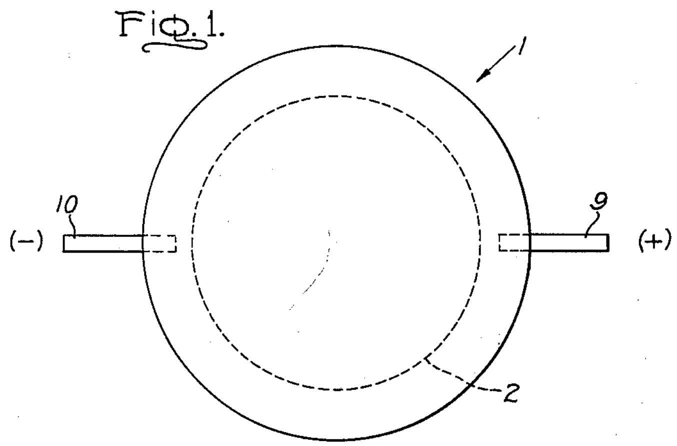

The present invention concerns the design and preparation of electroluminescent lamps in which the sources of light are oppositely contacted crystals through which D.C. or A.C. current, though preferably D.C., is caused to flow.

Electroluminescent devices in which light is produced by recombination processes in impact ionization avalanches of the charge carriers in the interior of the crystals, for example, in zinc sulfide single crystals, and sintered layers, are already known. Likewise known are designs wherein the luminescence results from recombination processes of the charge carriers in forward-biased p-n junctions, for example, with silicon, germanium, or silicon carbide SiC crystals. The present invention is a further development of the known luminescent processes in p-n junctions biased in the forward direction. As is well known, the disadvantage of p-n electroluminescence, for example in SiC, is the low efficiency of the luminescent process itself. Among other factors, this is due to the fact that the origin of the luminescence is confined to the narrow zone between n and p conductive areas of the crystal determined by the length of diffusion of the charge carriers; in other words, it is confined to a negligibly small part of the total volume of the crystal. Even if the conditions for radiative recombination of electrons and holes (vacant electron sites) are at an optimum in this area, the intensity of luminescent light cannot increase indefinitely with an increase of the current passing through the p-n junction, since each recombination center requires a certain finite time for a radiative transition so that saturation occurs. For this reason one cannot expect any large intensities of light emission from luminescent layers which are only about $10^{-3}$ cm. thick.

A further disadvantage of a p-n design lies in the fact that it does not permit separation of the luminescent and semi-conductive areas. It is known to be very difficult to produce donor and acceptor centers in semi-conductors with a large forbidden zone, whose distance from the respective bands is so small that normal temperatures are adequate for ionization. Nevertheless, if one wants to produce adequate conductivity at normal temperatures—and one is forced to do this unless one accepts high losses due to Joule heat—then the impurity concentration must be increased. However the high concentration of defects at the same time greatly increases the probability of radiationless transitions since the condition for high luminescent efficiency is a low concentration of defects and a large distance of the defect centers from the bands, in direct contrast to the optimum conditions for conduction phenomena. Further, in a p–n junction the strong doping leads to a reduction in the diffusion length and, consequently, a decrease in excitable volume.

These disadvantages are avoided in the device according to the invention. The basic thought is the use of p-i-n junctions in place of p-n junctions. The letter "i" here refers to "intrinsic," although it could also stand for "insulating" inasmuch as there is no true intrinsic conduction present at normal temperature due to the magnitude of the forbidden zone which is necessary for luminescent phenomena in the visible spectrum (about 2.5 E.V.). In practice, however, it might better be termed "highly resistive" as there exists no real insulator due to residual electrons from impurities and intentionally added centers.

The foregoing may be understood as follows: A highly resistive crystal which has been grown for optimum recombination luminescence is provided with oppositely positioned electrodes, one of which is capable of injecting electrons into the crystal with suitable polarity of the applied field, the other holes. The injection of charged carriers into highly resistive crystals is known to require very high field strengths due to the space charges created by the introduction of the new charges, unless the i-layer has a thickness no greater than 4 to 5 diffusion lengths. The conditions are quite different from the injection, for example, of charge carriers of one sign into a semi-conductor of the opposite sign, in which case the injected charges can be compensated for at once through the supply of an equal number of charges of the opposite sign.

In order to make the injection mechanism possible under these conditions, the crystal must be "started." Either the starting voltage must be made momentarily very high, or the crystal has to be made photoconductive by irradiation. Once the crystal has become photoconductive, it is possible to inject holes from one electrode and electrons from the other, since space-charge compensation has now become possible. These holes or electrons, respectively, can now flow through the crystal in opposite directions without becoming affected by strong space charges. The applied voltage, the emissivity of the electrodes, and the thickness of the i-layer must be so chosen that both currents are equal in magnitude and the charge carriers are annihilated only at the respective opposite electrode by recombination with charge carriers of opposite sign. These conditions must be closely met in order to obtain high efficiencies of significant magnitude.

Thus, once the crystal has become photoconductive after starting, it is possible for currents of both charge carriers to flow through the i-crystal after the starting condition has ceased to exist. In this manner it is possible to excite considerably larger crystal volumes to recombination electroluminescence than with a simple p-n junction. The p and n type electrodes which contact the i-crystal on opposite sides can have dimensions which are negligibly small in comparison with the thickness of the i-crystal, the latter being about 5 diffusion lengths thick; thin transparent surface layers are adequate. In this manner the areas which are designed for optimum recombination luminescence are cleanly separated from those areas designed for optimum semi-conductive properties with their opposite conditions of impurity activation, and the main volume of the crystal is available for generating light which can easily leave the crystal through the electrodes and side surfaces.

Thus the present lamp is completely different from other known ones. Its principal part is a highly resistive yet highly luminescent crystal wafer which carries on one side a layer which emits electrons, on the opposite, a layer which emits holes. In order to start the crystal, ignition is necessary with a high starting voltage or else photoconductivity must be produced in it unless its thickness is very small; for its operation an optimum voltage is required. In a p-i-n junction the excess carrier density is constant over the whole range of the i-type wafer, whereas in a p-n junction it decreases exponentially with distance from the center of the junction. This gives another advantage factor of 2 to 3 in favor of the p-i-n junction light source as regards brightness or efficiency. At lower than optimum voltage the luminescence is faint, whereas at higher than optimum voltage, the efficiency is reduced even though the luminous intensity increases.

It follows, from the above, that crystals suitable for use in lamps according to the invention should have equal and large electron and hole diffusion lengths, and in particular, it is desirable to have the mobilities of both charge carriers approximately equal. In general hole mobility is appreciably smaller than electron mobility, since the valence band is usually narrower than the conductivity band, such that the effective lattice mass of the holes is larger than that of the electrons. Moreover, the defect levels which form above the valence band and which may function as acceptors, have in general an energy distance from the valence band which is greater than the energy distance of defect levels which form under the conductivity band and may function as donors from the conductivity band.

These detrimental properties become less important the higher the homopolar bonding of the crystal becomes, that is, the lower its ionic bonding contribution. The homopolar nature is the stronger the more closely spaced the elements forming the compound are in the periodic system, and the lighter the cation and the heavier the anion is. From the point of view of structure, the most suitable ones are those crystals whose lattice structure is related to the diamond structure; that is, crystals which have diamond, zinc blende, wurtzite, or other related structures.

Among the pure elements in crystal form the most suitable is diamond. A suitable $A_{IV}B_{IV}$ (the Roman numeral subscript refers to the periodic table group) compound is SiC, whose hexagonal modification, which forms at temperatures above 2000° C., may be obtained in the purest form. Both crystals mentioned are difficult to prepare and to dope. Also suitable are derivatives of SiC in which the Si or the C is replaced by an atom of the third or an atom of the fifth column of the periodic system. Substitution may also be made with elements of the second and sixth columns. Examples are boron carbonitride and boron siliconitride, boron carbophosphide and boron silicophosphide, aluminum silicophosphide and arsenide, and zinc silicosulfide. Most of these compounds are difficult to prepare. Among the $A_{III}B_{V}$ compounds the most suitable ones are boron phosphide and boron nitride (which is prepared in the zinc blende structure under high pressure), aluminum nitride, gallium nitride, gallium phosphide as well as mixed crystals of these materials. Derivatives of the $A_{III}B_{V}$ crystals can also be used. For example, the $A_{III}$ atom may be replaced by atoms of group II and IV; for example, zinc silicoarsenide, beryllium carbonitride, etc. Similarly, the $B_{V}$ atom may also be replaced by atoms of the 4th and 6th column; for example, aluminum silicosulfide or selenide. Finally, both atoms may also be replaced at the same time and thus lead to compounds which resemble derivatives of SiC. Of course, mixed crystals of these compounds are also suitable. The melting points of these compounds are lower so that the preparation is quite feasible. From the $A_{II}B_{VI}$ compounds, ZnTe, ZnSe and ZnS and their mixed crystals and derivated substitutes are suitable, though in crystals like ZnS the amount of ionic bonding is already rather high leading to unfavorably low hole mobilities. This is slightly better in substituted crystals of this type, where Zn is substituted by copper, silver, aluminum, gallium or indium (the so-called ternary chalcogenides).

The preparation of these compounds is carried out according to essentially three methods. (1) The powdered elements are well mixed and pressed into pills which are reacted in an inert atmosphere or in vacuo. (2) The vapor of the hydride of the easily volatile component of the compound is carried over the heated powdered components of the compound to be formed, or it is reacted with the vapors of their volatile halides at high temperature. (3) The vapor of the easily volatile component is carried into a melt of the difficultly volatile component and the mixture then slowly cooled, allowing separation or precipitation of the compound. A fourth method utilizes precipitation of the compound in non-aqueous solvents; for example, in HCl or $NH_3$ or hydrazine. The halides of the more electropositive component are dissolved in this medium and the gaseous hydride or another suitable compound of the non-metallic component is introduced as in the precipitation of ZnS, except that a non-aqueous solvent is used.

In order to produce larger crystals from the microcrystalline powder thus obtained, one may use the same sublimation procedures for these unstable and easily sublimed compounds as are already known for the preparation of ZnS, CdS, ZnSe and SiC crystals. With some compounds it is also possible to grow crystals from the melt. In most cases, however, the surface tension is too low to keep the melting zone together due to the tendency of the compounds to decompose or sublime. The narrow or even negative interval between melting and boiling points is a property of all crystals with mixed homo- and hetero-polar bonding contribution. With some of the above-mentioned crystals it is possible to reduce the tendency to decompose by the application of high pressure of a noble gas, or nitrogen, or the more volatile component itself in a sealed-off quartz vessel. Thus the preparation of crystals from the melt becomes possible either without crucible, or by drawing from the melt using a high pressure furnace. The production of single crystals is also possible according to a procedure related to the Verneuil process for the production of rubies, whereby the crystal powder is allowed to flow through a heating zone within a high pressure furnace and to collect on a stalactite-like cone which is removed from below. Finally, it is possible to grow larger crystals by slow cooling of a melt in a temperature gradient in refractory crucibles. The refractory crucibles consist of graphite and may have non-porous coatings of carbides, nitrides, borides, and silicides of titanium, zirconium, or tantalum. Crucibles made of zirconium oxide with coatings of zirconium nitride or carbide are also suitable, as are crucibles of cerium sulfide, zirconium phosphide, as well as tungsten or molybdenum crucibles which are particularly suitable for the nitride compounds.

The impurity additions which are necessary for optimum luminescence of the crystals are introduced from the furnace atmosphere in the form of easily volatilized compounds during the preparation of single crystals from the available microcrystalline compounds. Certain additions such as beryllium and magnesium, which can function as an acceptor in $A_{III}B_{IV}$ compounds, or in combination with oxygen or sulfur as a luminescence center, can be introduced prior to the melting process since the losses by evaporation are small.

The application of the hole or electron emitting electrodes onto single crystals, which must be shaped such that losses by internal total reflection are minimized, is carried out by vaporization of the respective metals in vacuo or by cathode sputtering. Subsequently the crystal is annealed in order to bring about diffusion of the foreign atoms into the surface layers of the crystals.

In some crystals such as diamond, SiC, and BN the diffusion rate is so low and such high temperatures are required to make it appreciable that the deposited layer would evaporate rather than diffuse into the crystal, or the crystal itself would start to sublime, decompose or change over into a different modification. In such cases it has been found feasible to introduce the impurities by bombarding the surfaces with high energy ions. As an example there follows the description of the surface activation of diamond, SiC, and BP with boron, in other words the preparation of an electrode which emits holes. A suitable gas discharge vessel (canal ray tube) is filled with a mixture of about 90% purest hydrogen and 10% gaseous boron trichloride at a pressure of, order-of-magnitudewise, mm. Hg. The crystal to be bombarded is mounted upon the cathode in such a manner that only the desired areas are bombarded by the ions. This is achieved by wrapping the crystal in aluminum foil with cutouts over the desired areas. A gas discharge is now started by applying a voltage of 5–50 kv. D.C., and the unconsumed gas mixture is adequately circulated. A well-adhering layer of boron is formed without heating the crystal unnecessarily high. In similar manner it is possible to deposit any element which forms readily volatile compounds, especially halides, in the form of a tightly-adhering electrode and without the formation of a disturbing, chemisorbed gas layer in between. Another technique for the preparation of injecting electrodes is the well-known alloying technique using an alloy which contains the doping impurity and forms an eutectic of lower melting point than the crystal to be treated. Upon cooling, the dissolved parts of the original crystal recrystallize and now contain the desired doping impurities.

In the construction of p-i-n electroluminescent lamps in accordance with the invention, it is desirable to use flat, single crystals in the form of plates or wafers which are provided with transparent electrodes. These may be obtained by sawing smaller pieces from irregularly shaped larger crystals. In this connection it is important to determine that the crystals show anisotropic behavior with respect to the recombination electroluminescence such that it becomes imperative to select the most favorable crystal orientation. The crystal wafer may be mounted between two transparent electrodes which at the same time function as supports for the crystal inside an evacuated glass vessel. The pressure should be between $5\times10^{-3}$ and $10^{-5}$ mm. mercury. When a high voltage is applied, a weak glow discharge occurs at first which produces photoluminescence by particle excitation. In this manner the crystal becomes photoconductive and thus the flow of current through the crystal and hence the luminescent process proper can start while simultaneously the voltage is lowered. This manner of starting is not possible if the vacua are higher. In that case designs must be used whereby either a high starting voltage is applied or the crystal is irradiated with electrons.

In another construction, the crystals are embedded in transparent insulating media such as glass or organic plastics. These embedding media may contain ordinary electroluminescent phosphors which produce a flash of light upon application of voltage, thereby initiating the starting process. If the crystals are embedded in an insulating medium, the top and bottom faces of the crystals must, of course, remain uncovered. As is customary with ordinary electroluminescence, one electrode is fashioned of a reflecting, and the other of a transparent medium. The transparent electrodes are realized either by thin vaporized layers of gold or by evaporated or sputtered layers of tin, indium, or cadmium oxides. Also suitable are transparent, electronically conductive glazes or corresponding lacquers. The conductive glaze consists of a low melting borate glass which contains a high concentration of extremely small, nearly colorless tin dioxide crystals of high conductivity embedded therein. Similarly the conductive transparent lacquer consists of an organic binder in which is embedded a high concentration of extremely small but highly conductive tin or indium oxide crystals.

In order to produce large area light sources either for simple illumination purposes or for information display devices (for example electroluminescent TV screens) numerous flat and small crystals are disposed side by side. The carrier is a glass plate with conductive transparent oxide coating. The space between the separate crystals may be filled with plastics or glass or may be evacuated. One may, for example, attach the small crystals by means of a transparent conductive lacquer upon a transparent conductive glass plate whose conductive oxide layer is either continuous or divided up into numerous conductive strips. Next, the organic binder is applied such that it fills only the voids between the crystals but does not cover the upper face of the crystals. Finally a metallic reflecting electrode is applied.

If the crystals are to be mounted in a vacuum, they may be attached by means of a conductive enamel between two conductive glass plates whose non-conductive edges are fused together so as to form a flat cuvette. It is generally preferable to use inorganic embedding media or a vacuum in carefully tempered and degassed flat assemblies of the above-described kind.

Another embodiment of the light source of this invention consists of a crystal of, for example, cylindrical shape into which a centrally disposed hole is drilled by means of diamond tools. Suitable impurities are introduced into this hole and after suitable formation this hole provides one electrode, for example, the p-type electrode. The other electrode is applied from the outside onto the cylinder surface in the form of a large area transparent electrode.

Still further designs are possible with coherent polycrystalline layers. The preparation of such polycrystalline layers may be carried out by evaporation of the required compound in a vacuum or by cathode sputtering of the corresponding metal in a gas which contains the anion component. Finally it is possible to react at high temperatures the vapors of the metallic component of the compound together with the hydrogen compound of the nonmetallic component which is diluted with hydrogen, and to deposit the reaction product upon a glass, quartz, or ceramic plate following the technique known for ZnS. These layers may be formed either on substances which may be subsequently dissolved away such that only very thin free layers are obtained for further work, or metalically conducting or semiconducting materials may be used as carriers for the layer which at the same time may function as one electrode.

Figure 2:
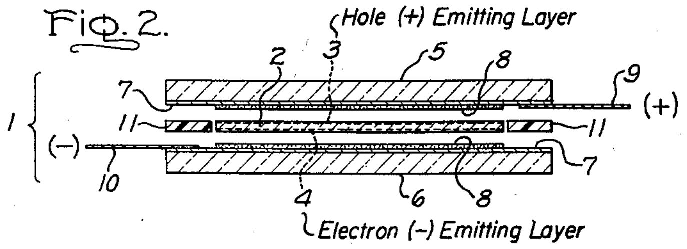

The drawing illustrates, by way of example, a p-i-n lamp embodying the invention, Fig. 1 being a plan view and Fig. 2 an exploded cross sectional view with the parts exaggerated in thickness.

Referring to the drawing, the core of the illustrated electroluminescent lamp 1 is a flat p-i-n crystal wafer 2. It is prepared in the following way. A mixture of 50% purest zinc sulfide and 50% purest zinc selenide (made by reaction of the elements) is placed in a suitable crucible, for instance made of spectroscopically pure graphite, zirconia, or cerium sulfide. This mixture is melted in a suitable furnace (for instance, such as I have described in Z. f. Naturforschg. 13*a,* 105 (1958)), under a high pressure argon atmosphere at about 1600° C. The melt is solidified by very slowly lowering the crucible into cooler parts of the furnace over a time of many hours. A Laue photograph is taken of the so obtained cubic single crystal, which normally has a weight of more than 100 grams, and a thickness of about one inch, and the direction of the axes of the crystal is determined. Afterwards, the crystal is cut with diamond saws into wafers of approximately ½ of a millimeter thickness, with the (111) axis perpendicular to the main surfaces of the wafers. Using well-known techniques, the thickness of the crystal wafer is then further diminished by polishing to about 50–100 microns. The disturbed and contaminated surface areas are then removed by etching with a mixture of HCl and HF.

In order to dope this wafer for optimum luminescence efficiency, it is embedded in zinc sulfide powder which contains the required impurities such as copper, silver, bromine and indium, and tempered for several hours in a neutral atmosphere at 600–800° C., so that the impurities can diffuse from the powder into the single crystal. The use of zinc sulfide as embedding powder has the advantage that the surface layers of the crystal are converted into pure zinc sulfide without interrupting the crystal structure, and the zinc sulfide surfaces have better chemical stability. As zinc sulfide has a larger band gap than zinc selenide, the whole crystal now is covered by a so-called tapered wide-band-gap surface which reduces losses due to surface recombination and permits the formation of very efficient emitting contacts.

The formation of the electrodes is done in the following way. The anode or hole-emitting contact (represented by dotted line 3 immediately below the upper surface of the wafer) is made by vacuum deposition of a thin layer consisting of the sulfides or selenides of copper, or silver, or antimony or arsenic, after purification of the crystal surface from adherent gasses by moving an electron beam over it. The contact is improved by heating the crystal in an inert atmosphere. The cathode or electron emitting contact (represented by dotted line 4 immediately above the lower surface of the wafer) is made by vacuum deposition of indium oxide and heating of the crystal. This electrode is transparent and conductive.

To assemble the lamp, a crystal wafer treated as described above, is sandwiched between conductive glass sheets 5, 6. The glass sheets may be made conductive by providing transparent tin oxide layers 7 on their facing sides. To assure intimate contact between the electrode layers and the conducting glass, conducting transparent lacquer layers 8 may be interposed. The terminals consist of metal foils 9, 10 pressed against the conductive tin oxide layers of glass sheets 5, 6 and serving respectively as anode and cathode contacts. The assembly is sealed by a ring 11 of insulating cement which holds the glass plates together.

What I claim as new and desire to secure by Letters Patent of the United States is:

1. An electroluminescent device comprising a thin wafer of intrinsically highly resistive crystalline material having optimum visible recombination luminescence, opposite surfaces of said wafer being doped to form thin semi-conducting transparent electrode layers, one for electron injection, and the other for hole injection into the wafer.

2. An electroluminescent device comprising a thin wafer of intrinsically highly resistive crystalline material which is doped for optimum visible recombination luminescence, opposite surfaces of said wafer being doped additionally to form thin semi-conducting transparent electrode layers, one for electron injection, and the other for hole injection into the crystal, so that upon application of a voltage in the forward direction to the wafer, the injected charge carriers are able to recombine radiatively within substantially the entire volume of the wafer.

3. An electroluminescent device as defined in claim 2 comprising predominantly homopolar bonded crystals of the diamond lattice type from the group consisting of diamond, silicon carbide, boron, aluminum and gallium nitride and phosphide, and zinc sulfide, selenide and telluride and their mixed crystals.

4. An electroluminescent lamp comprising a thin wafer of intrinsically highly resistive crystalline material which is doped for optimum visible recombination luminescence, opposite surfaces of said wafers being doped additionally to form thin semi-conducting transparent electrode layers, one for electron injection, the other for hole injection into the crystal, a pair of plates enclosing said wafer, at least one of said plates being vitreous and provided on its inside surface with a transparent conducting layer for contacting one of said electrode layers, said vitreous plate allowing transmission of light produced in said wafer.

5. An electroluminescent lamp comprising a thin wafer of a single crystal of zinc sulfide and material from the group consisting of zinc selenide and zinc telluride doped for optimum visible recombination luminescence by means of diffused impurities from the group consisting of copper, silver, bromine and indium and having tapered-band-gap surfaces for efficient emitter contacts and reduction of surface recombination wherein part of the material from the zinc selenide and zinc telluride group is replaced by zinc sulfide, said crystal wafer having on one side a hole-emitting electrode layer formed from the group consisting of the sulfides and selenides of copper, silver, antimony and arsenic and having on the other side an electron-emitting electrode layer formed of material from the group consisting of indium oxide and tin oxide, and a pair of plates enclosing said wafer, said plates being conductive on their internal surfaces contacting the electrode layers of said wafer, and at least one of said plates being light transmitting.

6. An electroluminescent lamp comprising a thin wafer of a single crystal of zinc sulfide and zinc selenide doped for optimum visible recombination luminescence by means of diffused impurities from the group consisting of copper, silver, bromine and indium and having tapered-band-gap surfaces for efficient emitter contacts and reduction of surface recombination wherein part of the zinc selenide is replaced by zinc sulfide and having on one side a hole-emitting electrode layer formed from the group consisting of the sulfides and selenides of copper, silver, antimony and arsenic and having on the other side an electron-emitting electrode layer formed of material from the group consisting of indium oxide and tin oxide, and a pair of plates enclosing said wafer, said plates being conductive on their internal surfaces contacting the electrode layers of said wafer, and at least one of said plates being light transmitting.

References Cited in the file of this patent

UNITED STATES PATENTS

| | | |
|---|---|---|
| 2,695,852 | Sparks | Nov. 30, 1954 |
| 2,739,907 | Nowak | Mar. 27, 1956 |
| 2,825,687 | Preston et al. | Mar. 4, 1958 |
| 2,827,436 | Bemski | Mar. 18, 1958 |
| 2,841,559 | Rosi | July 1, 1958 |
| 2,843,542 | Callahan | July 15, 1958 |
| 2,857,541 | Etzel et al. | Oct. 21, 1958 |
| 2,866,117 | Walker et al. | Dec. 23, 1958 |